June 8, 1954  F. G. NELSON ET AL  2,680,602
AGITATOR DEVICE FOR DIGESTER TANKS
Filed July 10, 1952  3 Sheets-Sheet 1

INVENTORS
Frederick G. Nelson
James O. Veach
BY William J Fox
ATTORNEY

June 8, 1954     F. G. NELSON ET AL     2,680,602
AGITATOR DEVICE FOR DIGESTER TANKS Filed July 10, 1952     3 Sheets-Sheet 2

INVENTORS
Frederick G. Nelson
James O. Veach
BY William J. Fox
ATTORNEY

June 8, 1954   F. G. NELSON ET AL   2,680,602
AGITATOR DEVICE FOR DIGESTER TANKS
Filed July 10, 1952   3 Sheets-Sheet 3

INVENTORS
Frederick G. Nelson
James O. Veach
BY William J Fox
ATTORNEY

Patented June 8, 1954

2,680,602

UNITED STATES PATENT OFFICE 2,680,602

AGITATOR DEVICE FOR DIGESTER TANKS

Frederick G. Nelson, La Habra, and James O. Veach, Los Angeles, Calif., assignors to The Dorr Company, Stamford, Conn., a corporation of Delaware Application July 10, 1952, Serial No. 298,134

2 Claims. (Cl. 259—97)

This invention relates to closed digester tanks for anaerobic digestion of liquid suspended organic matter, for example sewage sludge, and more particularly to agitating devices therefor.

Where, for instance, digested sludge is produced from a single tank, a closed digester tank holds a body of sewage sludge undergoing digestion by anaerobic bacteria which by feeding upon the suspended organic sewage matter convert raw sludge from an offensive to an inoffensive state, while gaseous by-products of such bacterial conversion or digestion are withdrawn from a so-called gas dome at the top of the tank. Fresh sewage sludge from sewage clarifiers is periodically pumped into the tank to feed into an upper zone of the body of sewage sludge which is being agitated, while digested sludge from a quiescent bottom zone is being withdrawn to a point outside the tank; digester supernatant overflows through a water seal from the tank, the liquid level in the tank being determined by the height of the supernatant overflow level and by the pressure of the gaseous by-products maintained upon the body of liquid in the tank and it may therefore vary somewhat with variations in the gas pressure. Mechanical agitation is periodically imparted to the upper portion of the body of sewage sludge in order that there may be maintained and promoted a healthy anaerobic bacterial action within the upper zone of the sewage body where most of the active anaerobic digestion is taking place, while digested sewage matter finds its way into the more quiescent bottom zone of the tank whence it is withdrawn as digester sludge.

More particularly, this relates to improvements in agitator-propeller devices which are mounted upon and carried by the top or dome of the tank, and which are employed for imparting to the sewage solids in that tank a degree of agitation and migration or circulation that is conducive to maintaining the digestion of the solids by anaerobic bacteria continually effective.

Such an agitator-propeller unit usually comprises an agitator shaft extending vertically through an opening in the top of the digester tank, with an agitator-propeller mounted at the free lower end of the shaft within the tank, and motor drive means provided at the upper end of the shaft outside the tank. The propeller shaft is rotatable in and guided by frame construction extending within the tank. For example, the shaft extends through a horizontal supporting closure plate or flange and has gas-sealing relationship therewith, the flange in turn being marginally supported upon and removably fastened to the edge portion of an opening in the tank top and in gas-sealing relationship therewith. Motorized drive means for the vertical shaft are carried by the flange.

This invention proposes to provide a self-contained individually powered agitator-propeller unit which by means of a horizontal flange is mountable upon the top opening of the digester tank and is liftable therefrom as a unit by detaching the flange from the tank. The vertical agitator shaft of such a unit should extend from the tank top a required distance downwardly into the tank with the propeller operating a suitable distance below the liquid level in the tank. The agitator unit as herein proposed therefore comprises as a part thereof a guide—and bearing structure for the shaft, which extends an appreciable distance downwardly from the supporting flange but terminates above the liquid level, while the free lower end portion of the agitator shaft extends a distance below the liquid level.

The agitator-propeller unit as proposed by this invention has the propeller member itself lodged in the top inlet end or mouth portion of a fixed vertical draft tube, the propeller to rotate in a direction whereby solids carrying liquid or sludge from the upper portion of the liquid body in the tank is drawn or forced continuously into the mouth portion and downwardly through the tube so as to exit therefrom into a lower or intermediate portion of the liquid body.

The agitator-propeller unit and the draft tube are so disposed with respect to each other as to induce floating or scummy matter to be drawn towards and into the top end of the tube; therefore, the draft tube although fully submerged should have its top edge disposed a suitable distance from, yet sufficiently close to the liquid level in the tank to induce the desired movement or migration of the floating matter towards and into the tube mouth. The propeller itself lodges within the mouth of the tube so as to minimize the free length of the lower end portion of the agitator shaft in order to discourage the setting up of vibrational forces in the unit because of the rotation of the shaft.

This invention is based upon recognizing that there are latent drawbacks in the arrangement above outlined. That is to say, while such relationship as between the agitator-propeller unit, the draft tube and the liquid level is desirable on the face of it, it may defeat its purpose or reduce the desired rate of circulation because of what might be termed a self-choking effect of a swirl set up by the propeller.

However, rapid and efficient circulation of the sewage solids through the draft tube and thus through the sewage body in the tank during periods of agitation is desirable and of importance for the maintenance of healthy anaerobic bacterial reaction therein; thus there arises the problem of how to circulate large volumes of liquid-carrying sewage solids, bacteria, and digestion products down through the draft tube by mechanical impulse effectively and economically, namely, with a minimum of power requirement, during the periods of agitation.

It is among the objects of this invention to improve effectiveness and economy of such a self-contained agitator-propeller unit with respect to volume of circulation and with respect to its ability to draw floating matter towards and into the draft tube, without materially changing or upsetting the above outlined desirable structural and operational relationship.

Another object is to prevent rags or stringy material in the sewage from becoming entangled with or get wrapped around the exposed or free lower end portion of the agitator shaft while rotating.

To attain these objects, this invention proposes to surround the exposed or free lower end portion of the agitator shaft with an auxiliary structure serving the dual purpose of precluding entanglement of objectionable matter on the shaft and of eliminating the self-choking swirl effect of the propeller. In this way the aforementioned latent drawbacks are eliminated.

According to one feature, the auxiliary structure is in the form of a stationary bladed or vaned structure which comprises a vertical tubular shroud member surrounding the agitator shaft from the propeller up to the stationary guide structure upwardly, and a plurality of vertical vanes extending radially from this tube along the length thereof. The vaned structure is held stationary and in the desired position with respect to the agitator unit and the draft tube by having the upper edge portions of the vanes connected with the stationary guide structure directly above.

More specifically, the radial vanes extend a vertical distance down into the mouth of the draft tube as well as a vertical distance upwardly to a point above the liquid level in the tank.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly co-operative equivalents, are therefore intended to be embraced by those claims.

Figure 1:
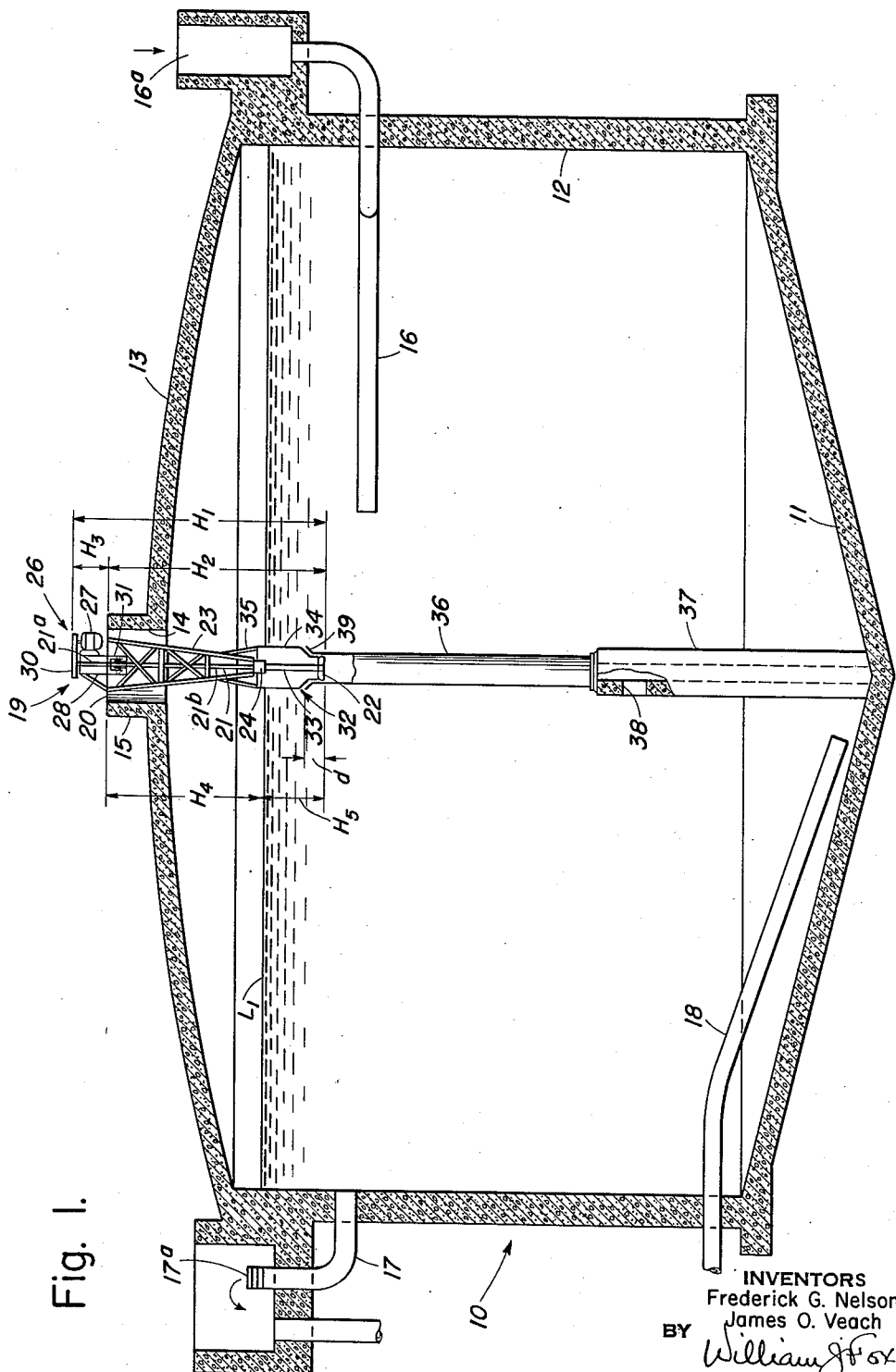
Figure 1 is a semi-digrammatical vertical sectional view of a digester having an agitator-propeller unit equipped with the efficiency improving vaned auxiliary structure.
Figure 2:
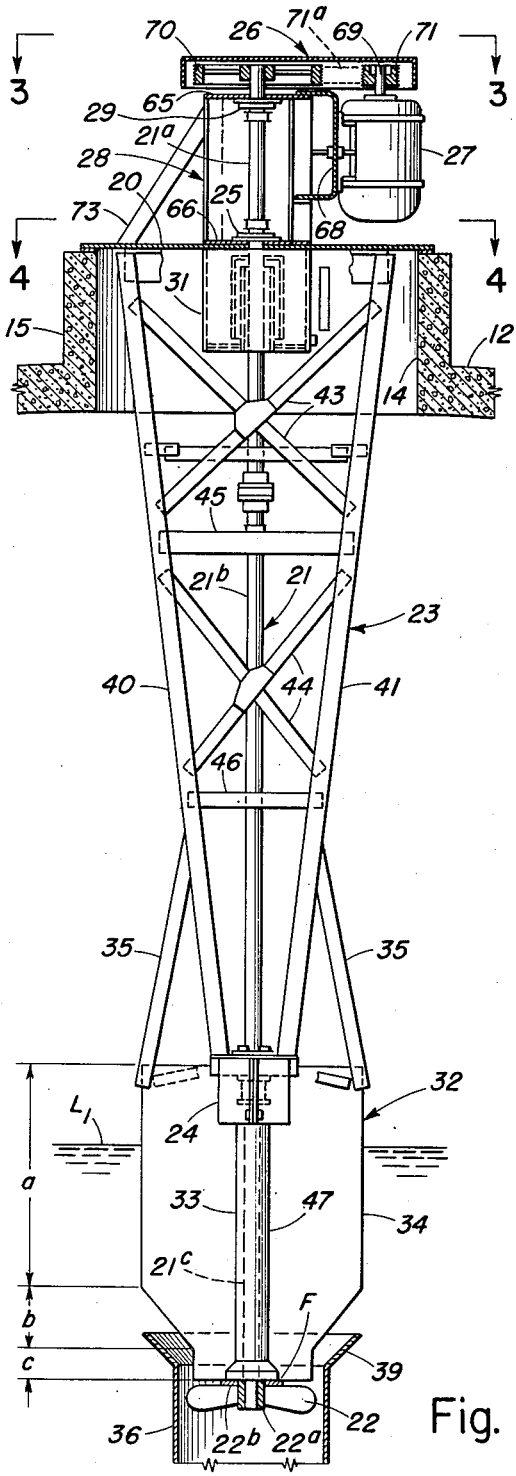
Figure 2 is an enlarged detail view of the agitator-propeller unit shown in Fig. 1.
Figure 3:
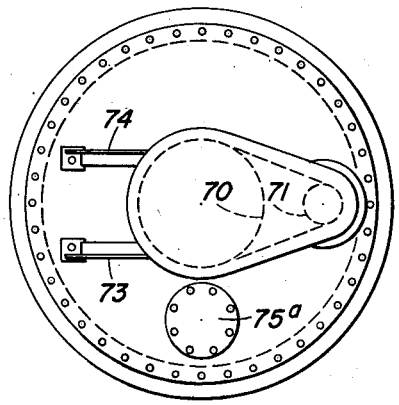
Figure 3 is a top view taken along line 3—3 of Fig. 2.
Figure 4:
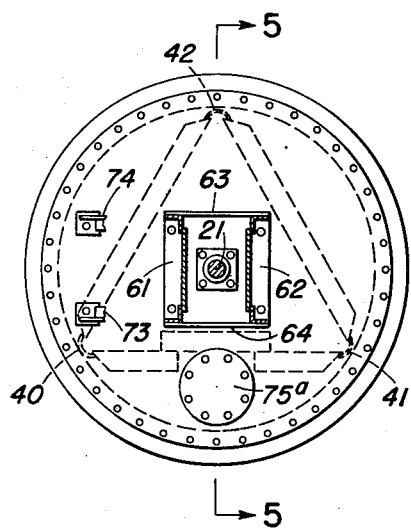
Figure 4 is a cross-section view taken on line 4—4 of Fig. 2.
Figure 6:
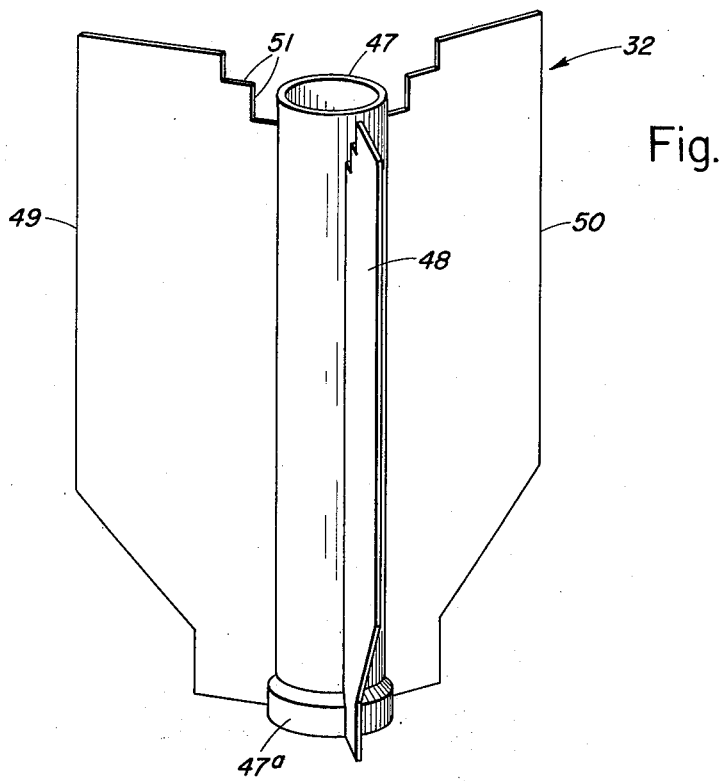
Figure 6 is a greatly enlarged detail perspective view of the vaned auxiliary structure.
Figure 5:
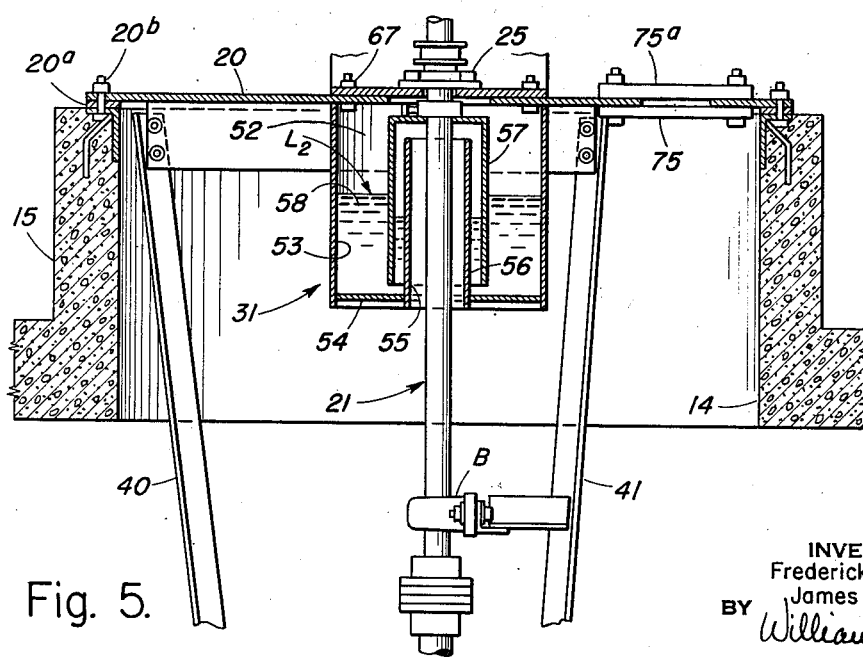
Figure 5 is a further enlarged detail view of an intermediate portion of the agitator-propeller unit of Fig. 2 showing in greater detail the disposition of the labyrinth type seal and associated parts of the structure.

A closed digester tank 10 in Fig. 1 represents the environmental structure for the improved agitator-propeller unit according to this invention. This tank is shown to be a concrete structure comprising a bottom 11 of shallow inverted conicity, a cylindrical wall 12 rising from the bottom, and a shallow domed top 13 having a central opening 14 formed by a cylindrical edge portion or short neck portion 15. A body of liquid or sewage sludge in the tank is indicated by its liquid level L1.

Feed of raw sewage sludge into the digester tank is indicated by a feed pipe 16 leading from a feedwell 16a, supernatant liquid briefly called "supernatant" overflows from the top of the tank through an overflow pipe 17 having an adjustable overflow indicated by rings 17a, digester sludge is withdrawn from the bottom zone in the tank through a sludge withdrawal pipe 18.

The improved agitator-propeller unit designated collectively in Fig. 1 by the numeral 19 has a top cover plate 20 closing upon and supported by the tank top through its neck portion 15 and sealingly fastened thereto. A vertical agitator-propeller shaft 21 of the length $H_1$ substantially represents the total height of the agitator unit, and has fixed to its lower end a propeller member 22. The shaft rotates in a guide structure 23 extending rigidly downwardly from the top closure plate 20, which guide structure is composed of structural steel members and has a lower or bottom end vertical bearing 24 and an upper vertical bearing 25 for the shaft 21.

Thus the total length $H_1$ of the shaft divides itself into a component length $H_2$ extending below the top cover plate 20, and a component length $H_3$ extending above the top cover plate 20 and defining the upper end portion 21a of the shaft. The length $H_2$ of the shaft in turn subdivides itself into a guided length $H_4$ surrounded by and substantially equal to the vertical length of the guide structure 23 and defining an intermediate portion 21b of the shaft, and a length $H_5$ defining a lower free or unguided end portion 21c of the shaft.

The upper end portion 21a of the shaft is associated with power drive means 26 mounted upon the top cover plate 20, and comprising a vertically disposed motor 27 mounted upon the top side of a cage structure 28 surrounding the upper end portion 21a of the shaft and fastened upon the top side of the cover plate 20. The cage structure 28 has at the top thereof a third bearing 29 for the propeller shaft 21. Power transmitting means between the motor 27 and the shaft 21 are indicated at 30.

Disposed at the underside of top cover plate 20 is a sealing compartment 31 surrounding the shaft and presenting a labyrinth type liquid sealing effect between the shaft and the top cover plate 20.

The lower end portion 21c of the shaft is surrounded by a stationary auxiliary structure 32 comprising a vertical tubular portion or tubular shroud 33 and a set of vertical vanes 34 extending radially from the tubular shroud 33. The auxiliary structure 32 is fastened to the guide structure 23 as by means of brace members 35 extending between the upper ends of respective vanes 34 and the guide structure 23.

The agitator-propeller unit 19 is coaxial with a vertical draft tube 36 mounted upon a hollow pedestal 37 having exit openings 38, the draft tube having an outwardly flaring inlet end or mouth portion 39. The propeller member 22 of the unit lodges within the mouth portion of the draft tube a distance "d" from the top edge thereof.

The agitator-propeller unit will now be described in greater detail by references to the detail Figures 2, 3, 4, 5, 6 and particularly so in regard to details of the guide structure 23 with its labyrinth type liquid sealing compartment 31, of the cage structure 28 with its motor drive means 26, and of the vaned auxiliary structure 32.

The guide structure 23 is triangular in cross-section and is a composite of structural steel members, namely of three longitudinal corner members 40, 41, 42 converging downwardly to constitute the general shape of an inverted slender triangular pyramid or trylon with the lower ends of the corner members terminating at and fastened or welded to the bearing 24, and the upper ends of the corner members fastened as by welding to the underside of top cover plate 20. The guide structure 23 is rigidified by means of diagonal bracing indicated at 43 and 44 as well as by transverse bracing 45 and 46, provided between each respective pair of the corner members 40, 41, 42.

The vaned auxiliary structure 32 (see Figs. 2 and 6) comprises a tubular shroud member 47 shown to be formed at its lower end with a widened portion 47a. A set of three vertical vanes 48, 49, 50 extend radially from the shroud member 47 to which they are welded, and they are disposed angularly (see Fig. 2) so as to register with respect to the corner members 40, 41, 42 of the guide structure. At the upper edge portion the vanes have a stepped contour 51 corresponding to the outline of the lower end of the guide structure 23 and of the bearing 24. The lower end portion of the vanes has an edge contour corresponding to the shape of the mouth 39 of draft tube 36. That is to say, the outer side edge portion of each vane comprises a long vertical length "a," an inclined length "b" and a short vertical length "c," the length "c" and part of the inclined length "b" lodging within the mouth portion 39 of draft tube 36. The propeller member 22 has a hub portion 22a shown to have welded thereto an annular extension 22b so as to present upwardly a larger hub face F slightly larger than the lower terminal diameter of the adjoining lower end portion 47a of the shroud member 47.

The labyrinth type sealing compartment 31 comprises (see Fig. 5) an annular sealing chamber 52 defined by a cylindrical outer wall 53 welded sealingly to the underside of top cover plate 20, an annular bottom portion 54 providing a central opening 55 and a cylindrical boot 56 rising from the edge of the opening 55 to surround the shaft 21 in spaced relationship therewith. A bell shaped downwardly open sealing member 57 is sealingly fixed to the shaft 21 concentrically therewith and surrounds the boot 56 in spaced relationship therewith and is submerged into a body of sealing liquid 58 contained in the annular chamber 52 and indicated by its level $L_2$ therein.

The cage structure 28 is shown to be of substantially rectangular cross-section (see Fig. 4) defined by side walls 61, 62, 63, 64 and has a top plate 65 and a bottom plate 66 fastened to the top cover plate 20 as indicated by bolts 67. The motor 27 is mounted upon the side of cage structure 28 by means of a bracket 68, while the power transmitting means effective between the motor shaft 69 and the propeller shaft 21 are indicated by pulleys 70 and 71 and by an endless drive transmitting means 71a engaging them. A pair of inclined brace members 73 and 74 are provided for an extend laterally of the cage structure 28 and opposite to the motor 27. These inclined brace members may be either bolted or welded to the top face of the top plate 20 and to the top end portion of the cage structure 28 respectively.

The top cover plate 20 is shown to have a gasket member 20a between it and the neck 15 of the tank top is fastened thereto as is indicated by bolts 20b. A steadying bearing "B" for shaft 21 is shown to be mounted within and upon the guide structure 23. The top cover plate 20 is shown to be provided with an observation glass window or handhole 75, having a removable cover 75a. Well known gas withdrawal means are provided for and associated with the top 12 of the tank, but are here not particularly shown.

We claim:

1. For use with a closed digester tank adapted to hold a body of liquid defined by its liquid level in the tank, and having a fixed domed top provided with an opening, and also having a fixed vertical submerged draft tube rising from the bottom; an individually powered agitator-propeller unit comprising a top closure plate for said opening, a vertical agitator-propeller shaft of a length extending a distance above and a distance below said plate and coaxially with said draft tube and in vertically predetermined as well as gas-sealed relationship with said plate, a vertical guide structure extending rigidly from said top closure plate downwardly into the tank to surround and guide an intermediate portion of the length of said shaft for rotation therein so that the lower end portion of said shaft extends below said guide structure, power drive means associated with the top end portion of the shaft and supported by said top closure plate, a propeller member fixed upon the lower end of the shaft to lodge within the adjacent upper end inlet mouth portion of the draft tube for drawing sewage liquid and scum into said mouth portion, an auxiliary flow-rectifying anti-swirling vane structure comprising a vertical tubular shroud member surrounding said lower end portion of the shaft below said guide structure, a set of vertical vanes extending radially from said tubular shroud member, and means for rigidly connecting said vane structure with said guide structure with the addition that said vanes extend downwardly a distance into the mouth portion of the tube and upwardly to a point above the liquid level in the tank, said agitator-propeller unit including said vane structure being removable from said digester tank by said closure plate being lifted from said opening.

2. The agitator-propeller unit according to claim 1, in which said vanes extend downwardly a distance into the mouth of the tube and upwardly to a point above the liquid level in the tank.

References Cited in the file of this patent

UNITED STATES PATENTS

| Number | Name | Date |
|--------|------|------|
| 317,559 | McRae | May 12, 1885 |
| 798,568 | Clark | Aug. 29, 1905 |
| 2,043,119 | Pruss | June 2, 1936 |
| 2,605,220 | Logan | July 29, 1952 |

OTHER REFERENCES

The Dorr Company-Bulletin No. 6591 of 1949.